(No Model.)
C. A. HUSSEY.
ELECTRIC BATTERY.
No. 406,169. Patented July 2, 1889.
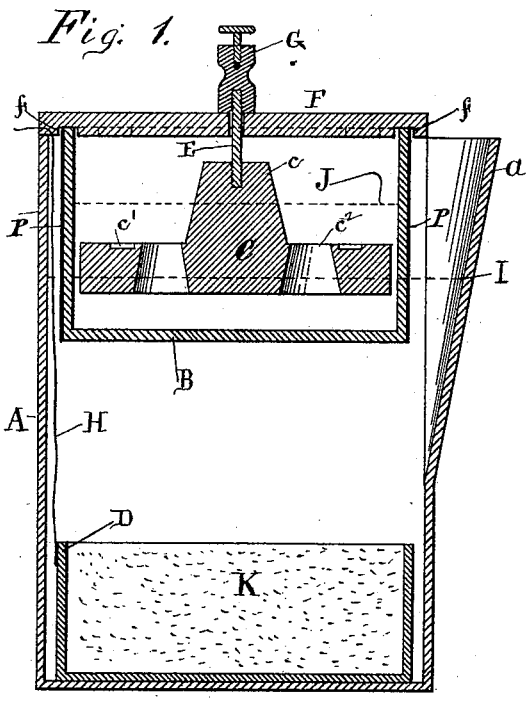
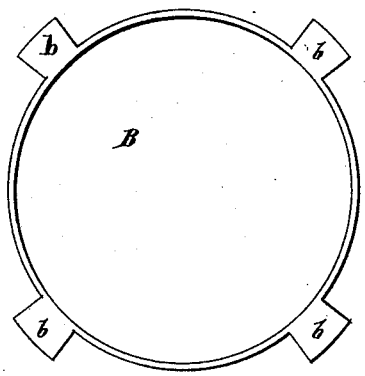
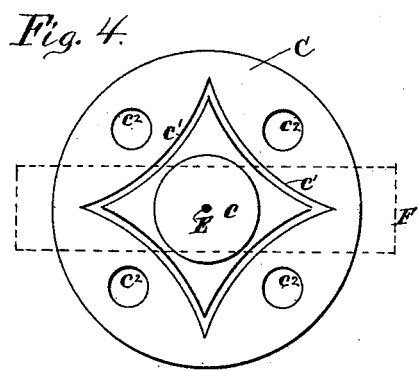
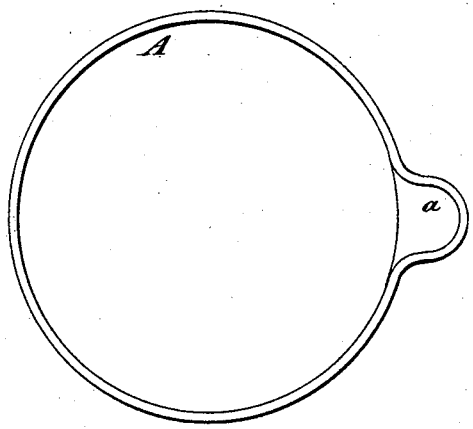
WITNESSES:
William H. Robinson
INVENTOR
Charles A. Hussey
BY Gifford & Brown
His ATTORNEYS.

UNITED STATES PATENT OFFICE.

CHARLES A. HUSSEY, OF NEW YORK, N. Y.

ELECTRIC BATTERY.

SPECIFICATION forming part of Letters Patent No. 406,169, dated July 2, 1889.

Application filed March 18, 1889. Serial No. 303,644. (No model.)

*To all whom it may concern:*

Be it known that I, CHARLES A. HUSSEY, of New York, in the county and State of New York, have invented a certain new and useful Improvement in Electric Batteries, of which the following is a specification.

I will describe an electric battery embodying my improvement, and then point out the novel features in claims.

In the accompanying drawings, Figure 1 is a central vertical section of a battery embodying my improvement. Fig. 2 is a top view of the cell. Fig. 3 is a top view of a cup forming part thereof. Fig. 4 is a top view of the positive element. In this view I have illustrated in dotted outline a bar which rests upon the top of the cup and from which the positive element is suspended.

Similar letters of reference designate corresponding parts in all the figures.

A designates the cell.

B designates a porous diaphragm, here shown as comprised in a cup.

C designates the positive element. This, it will be seen, is located above the porous diaphragm B.

D designates the negative element.

Having given this general description of the parts, I will explain them more in detail.

The cell A is shown as made in cylindric form with a spout $a$ formed at the upper portion. The cell may be made of glass or other suitable material.

The diaphragm B may be made part of a cup of porous material—such, for instance, as kaolin. If so made, the side wall will be rendered non-porous in some manner. This may be done by applying to the exterior of the side wall, or both the exterior and interior of the side wall, paraffine P. The paraffine P may be applied in any suitable manner—as, for instance, by a brush or by dipping the side wall. As shown, this cup is supported by means of flanges or lugs $b$, formed integral with it and extending sufficiently beyond it to rest upon the top edge of the cell.

The positive element C may be made of zinc, is shown as of circular form provided with a central hub $c$, and furnished in the upper surface with a groove $c'$, adapted to contain quicksilver, and provided with holes $c^2$, through which fluid may pass. I have shown this positive element suspended by a rod E, which may be screwed or cast into the central hub $c$, and which, as here shown, extends through a bar F and engages with a binding-post G by screwing into a tapped hole therein or in any other suitable manner. The bar F extends across the top of the cup, of which the diaphragm forms part, and has grooves $f$ in the under side to fit the edge of such cup, so that it will occupy the desired position, and thereby center the positive element.

The negative element D, I have shown as made in the form of a cup. It may be made of copper. Of course the shape I have illustrated is not essential. It is represented as resting upon the bottom of the cell.

It will be observed that there is a considerable space between the cup of which the porous diaphragm forms part and the outer portion of the spout, and that thus there is a clear passage through the spout to the portion of the cell beneath said diaphragm.

A wire extends from the negative element D. It may be united with this element in any suitable manner—as, for instance, by solder. This wire is shown as extending from the cell. It may be connected by any ordinary coupling-piece to the circuit of which it is to form part. The other circuit-wire for the battery will extend from the binding-post G.

There is a fluid I in the cell A and a fluid J in the cup of which the diaphragm B forms part. The battery is therefore a two-fluid battery. I have represented the cup D, forming the negative element, as having crystals of sulphate of copper K in it. The fluid I may be water or water acidulated with sulphuric acid, and the fluid J in such case may also be an aqueous solution of sulphuric acid.

The passage formed by the spout affords facility for replenishing the cell with sulphate of copper without dismounting any of the parts of the battery, because the crystals of sulphate of copper may be dropped through this passage, and a syringe or other device for drawing off excessive fluid may be inserted in this passage.

It will be observed that the fluid J is at a higher level than the fluid I. This is important in conjunction with the cup of which the diaphragm B forms part, for with such a relation between the fluids and a separating-diaphragm the extra pressure of the fluid J, due to its having a higher head or level, will prevent the fluid I from passing from the cell upwardly through the diaphragm B, and hence will preclude the fluid I from reaching the positive element.

What I claim as my invention, and desire to secure by Letters Patent, is—

1. In an electric battery designed for two fluids, a porous diaphragm for separating the two fluids and extending solely in a horizontal or approximately horizontal plane and having non-porous vertical walls, substantially as specified.

2. In an electric battery designed for two fluids, the combination, with a cell, of a cup having a porous bottom portion and an upper non-porous portion, substantially as specified.

3. In an electric battery designed for two fluids, a cell made of porous material, the upper portion being made non-porous by the application of a material closing the pores and resisting the fluids in the battery, substantially as specified.

4. In an electric battery designed for two fluids, the combination, with a cell provided with a spout, of a cup arranged in the upper part of the cell, its bottom being above the lower portion of the spout, substantially as specified.

CHAS. A. HUSSEY.

Witnesses:
S. O. EDMONDS,
EDWIN H. BROWN.